United States Patent Office 3,522,388
Patented July 28, 1970

3,522,388
ELECTROLUMINESCENT DIODE LIGHT SOURCE HAVING A PERMANENT IMPLANTED OPAQUE SURFACE LAYER MASK
Allan S. Miller, Wellesley, Mass., assignor, by mesne assignments, to Norton Research Corporation
Filed Nov. 30, 1966, Ser. No. 598,094
Int. Cl. G11b 7/18; G01d 9/42; H05b 33/00
U.S. Cl. 179—100.3                          2 Claims

ABSTRACT OF THE DISCLOSURE

An electroluminescent diode is employed as the light source in a photographic data recording system. A mask defining a narrow light-transmitting slit is formed on one surface of the diode by selectively diffusing an impurity into the surface of the diode to render the mask portion opaque.

---

This invention relates to a camera for recording sound or other data on a photographic film, the camera embodying an electroluminescent junction diode as the light source.

A principal object of the present invention is to provide a camera capable of very high frequency response.

Another object of the invention is to provide a camera capable of producing extremely small, closely-spaced, discrete exposed areas on a photographic film by using an electroluminescent diode having a precisely controlled light-transmitting area.

Still another object of the invention is to provide an improved electroluminescent junction diode.

These and other objects of the invention will be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed discussion thereof taken in connection with the accompanying drawings in which.

SUMMARY OF THE INVENTION

The present invention is particularly concerned with a means for recording data, such as sound on a photographic film, by projecting light from an electroluminescent diode onto the surface of the film. For recording high frequency sound and for recording a high density of information on a small amount of film, it is essential that the light be emitted from the diode in a very small, carefully defined, area. In the present invention, the light-transmitting area of the diode is defined by an opaque mask surrounding a transparent surface of the diode. This mask is formed within the surface by diffusing an opacifying impurity into a clear portion of the diode. In a preferred embodiment of the invention all of the surface of the diode except the light-transmitting area is etched to provide a mesa for the light-transmitting area prior to the diffusion operation. When the mesa is removed, by polishing, there is left a clear window through the mask. Alternatively, the light-transmitting area may be masked by a barrier layer during the diffusion operation so that this masked area remains free of the impurity and remains transparent. This latter technique is particularly useful where diffusion of the impurity is accomplished at temperatures below 1300° C. where $SiO_2$ can be conveniently used as a mask. Accordingly, the final diode has a surface, most of which is opaque, with a small, light-transmitting area (or areas) of carefully, and precisely controlled, dimensions. The surface of the diode remains otherwise unchanged and the mask is permanently implanted into the surface. The mask cannot be rubbed off and there is no slit to trap dirt and the like. The mask can also act as a low resistance path for light generating current fed to the diode.

In one form of the invention, the mask is formed on the upper surface of one of the layers of the diode in a plane parallel to the junction. In another modification, the mask is formed at one edge of the diode in a plane normal to the junction.

In order that the invention may be more fully understood, reference should be had to the drawings taken in connection with the accompanying specific examples.

Figure 1:
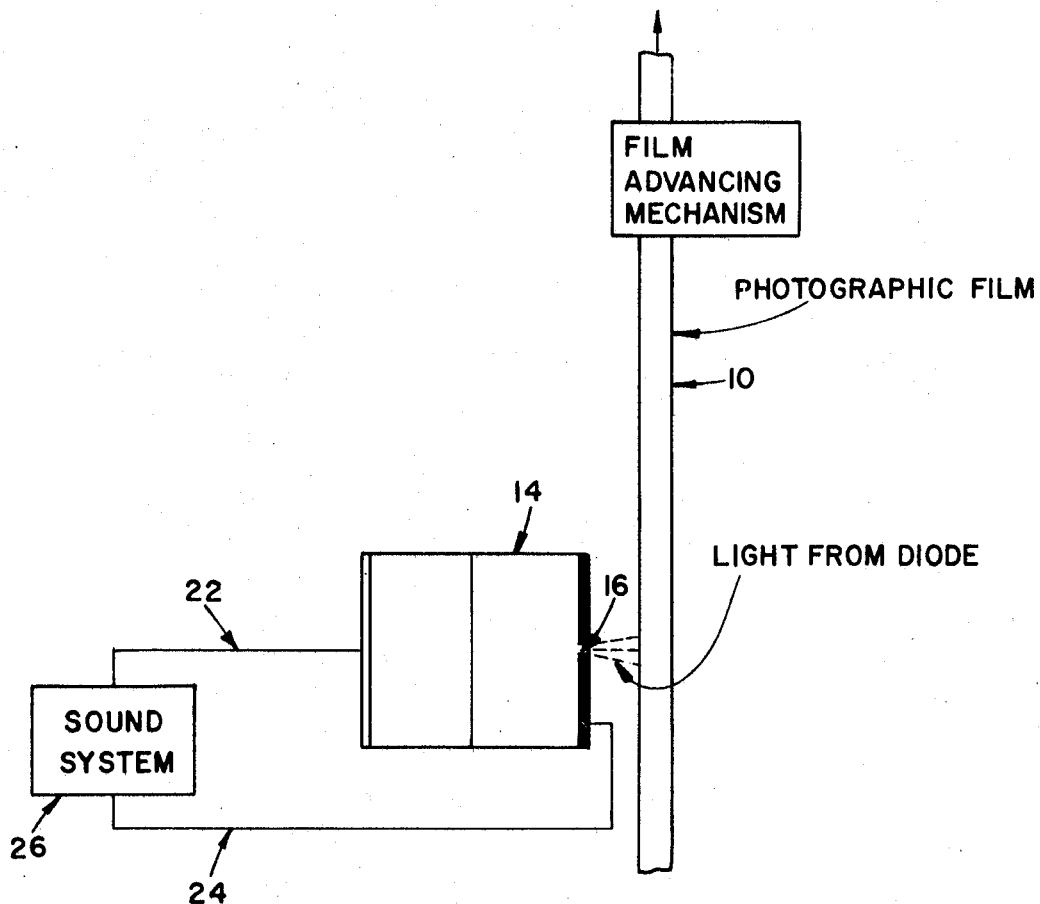
FIG. 1 is a diagrammatic, schematic view of a camera embodying the invention.

In FIG. 1 there is illustrated a camera having a photosensitive film 10 arranged to be advanced by a suitable advancing mechanism 12 past a light-emitting diode 14. This diode 14 has a light-transmitting slit 16 which directs light to the film 10. Current leads 22 and 24 feed modulated current to the diode from sound system 26.

Figure 2:
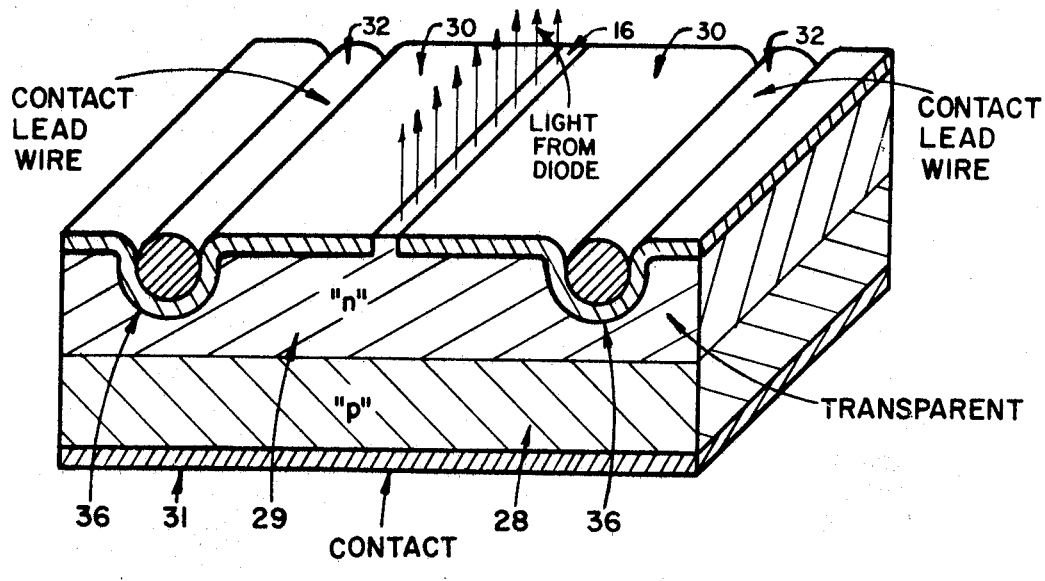
FIG. 2 is a diagrammatic, schematic, enlarged, sectional view of one preferred form of diode of the present invention.

Referring now to FIG. 2, there is shown in greater detail a preferred type of diode particularly useful in the combination shown in FIG. 1. In this preferred arrangement, the diode consists of a single crystal, preferably formed of silicon carbide, having "p" and "n" regions 28 and 29, respectively. A pair of contact lead wires 32 are provided on the upper "n" layer 29 and a single large area contact 31 is provided adjacent the lower surface of "p" layer 28. The "n" layer 29 is transparent to light generated adjacent to the "p-n" junction so that the light underneath the light-transmitting area 16 can escape from the crystal and be used for exposing the photosensitive film. As can be seen the top surface of the "n" layer 29 includes (in addition to the light-transmitting slit 16) a pair of opaque sections 30 to prevent light from escaping from any portions of the crystal top surface except the slit 16. The pair of contact lead wires 32 are positioned in grooves 36, these contact lead wires providing the current lead to the "n" section of the crystal. The light-emitting crystal shown in FIG. 2 is formed, in one preferred embodiment of the invention, as set forth in the following nonlimiting examples:

Example 1

A "p–n" junction is formed in a silicon carbide crystal in accordance with the technique described in the copending application of Vitkus Ser. No.589,363, filed Oct. 25, 1966, and now Pat. No. 3,462,321. The resulting light-emitting junction diode has a relatively opaque "p" layer and a thin transparent "n" layer which is about .002 to 0.10 inch thick. Since the "n" layer is essentially transparent, it is used as the light-transmitting layer.

In forming the device of FIG. 2, essentially all of the operations discussed below take place on the upper surface of the "n" layer. First, a uniform silicon oxide layer about 1 micron thick is created on the upper surface of the "n" layer such as by thermal oxidation. Thereafter, a layer of photoresist material such as KPR (Kodak Photo Resist) is spread on the upper surface of the silicon oxide layer. This photoresist layer is then exposed by known techniques to provide for exposure of all portions of the KPR except those portions overlying the locations of the grooves 36. The unexposed portions of the photoresist overlying the locations of grooves 36 are removed during the developing operation. The underlying exposed silicon oxide is then removed by an etchant such as a solution of hydrofluoric acid. The remaining KPR is removed and the exposed area of silicon carbide (at grooves 36) is etched with hot chlorine to a depth sufficient to contain the lead wires 32 but not to a depth sufficient to contact the junction. The surface of the crystal is again covered with KPR photoresist and is exposed to light which exposes only the portions of the KPR overlying the region 16. The unexposed photoresist material is removed during the development of the photoresist and all of the thus exposed $SiO_2$ is removed by an etchant such as hydrofluoric acid. The remaining photoresist material is removed leaving a strip of $SiO_2$ on top of the location of the light-transmitting slit 16. The exposed silicon carbide is then uniformly etched with hot chloride to a depth of 5 to 10 microns leaving a mesa underlying the strip of $SiO_2$. The $SiO_2$ is next removed by etching in HF. Thereafter, an "n" type opacifying impurity such as phosphorous or nitrogen is diffused into the whole surface of the crystal by firing the crystal in a furnace at about 2000°–2500° C. for 10 to 120 minutes in an atmosphere of helium or argon with a partial pressure of the selected impurity. The diffusion is carried out to a depth sufficient to eliminate light transmission but not to penetrate to the "p-n" junction. This converts all of the SiC surface into an opaque layer. The mesa of the light-transmitting slit is then ground off to remove the opaque layer in the mesa. The upper contact lead wires 32 and the lower contact 31 are then secured and the diode is ready for use, although it may be desirable to repolish the upper surface of the "n" layer 29.

Example 2

Figure 3:
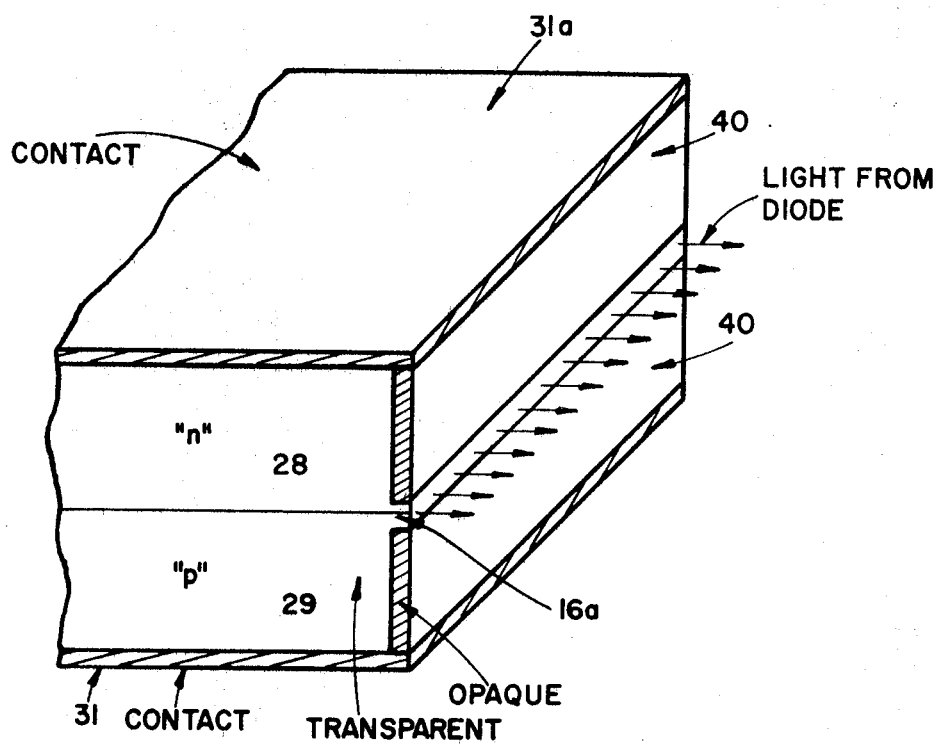
FIG. 3 is a diagrammatic, schematic view of another form of diode of the present invention.

In this case, a diode having the construction shown in FIG. 3 is formed from a silicon carbide junction of the same type as that employed in Example 1 except that the "p" layer is preferably heavily doped. In FIG. 3, the mask is to be formed on an edge of the junction diode which is perpendicular to the plane of the junction. This edge is first uniformly oxidized to provide a silicon dioxide layer about 1 micron thick, this oxidation preferably comprising a thermal oxidation step. Alternatively, the $SiO_2$ layer is formed by pyrolytic decomposition. Thereafter a layer of photoresist such as KOR or KPR is spread over the silicon dioxide layer. The diode is then illuminated by passing a current through the diode in the forward direction. Since the light emitted from the diode is more strongly concentrated immediately adjacent the junction, this portion of the photoresist receives the greatest amount of exposure. By controlling the amount of photoresist, time of exposure and the amount of current for a given diode, there can be obtained a carefully and narrowly defined exposed line of photoresist. The unexposed photoresist is removed during the development of the exposed photoresist. The uncovered portions of the silicon dioxide are then etched away by exposure to a solution of hydrofluoric acid. Thereafter the remaining photoresist is removed, leaving a silicon carbide surface having a fine $SiO_2$ line adjacent the junction. The exposed silicon carbide is then uniformly etched with hot chlorine to a depth of 5 to 10 microns leaving a mesa underlying the strip of $SiO_2$. The $SiO_2$ is next removed by etching in HF. Thereafter an opacifying impurity such as phosphorous or nitrogen is diffused into the whole edge of the crystal. This diffusion is preferably carried out in a furnace at about 2000°–2500° C. for 10–120 minutes in an atmosphere of helium or argon containing a partial pressure of the impurity. The diffusion is terminated before the impurity penetrates to the junction. This converts all of the edge 40 of the silicon carbide crystal into an opaque layer. The mesa overlying the region 16a is then ground off to remove the opaque layer in the mesa. Thereafter the edge of the diode is repolished.

While two methods of manufacturing the diode have been described above in Examples 1 and 2, it is apparent that different impurities can be used for opacifying the two different types of crystals. Thus, for example, there may be used an "n" type impurity such as nitrogen for opacifying the "n" type section of the crystal, and a "p" type impurity such as aluminum for opacifying the "p" type section of the crystal. This requires several additional photoresist and etching steps. A diffusion of "n" type impurities (phosphorous or nitrogen) just sufficient for opacifying the non-junction layers but not sufficient to convert the "p" type material to "n" type may be used. Alternately, a heavily doped "n" and a lightly doped "p" layer may be used with a very carefully controlled "p" diffusion. A third alternate may be used where such close diffusion control is undesirable. In this case, one type of diffusion is used all around the diode but the side where a conversion from one impurity type to another had taken place is ground away before contacting. This leaves an opaque layer of opposite type adjacent the junction, but this opaque layer "floats" electrically in that it is not directly in contact with the similar layer on the other side of the junction.

While one preferred embodiment of the invention has been described above wherein the film is moved past a stationary diode, it is apparent that the diode may be moved past a stationary film. Equally, while a line source has been described, a series of dots, patterns and other forms of light-emitting patterns on the diode can be employed where desired. Additionally, a number of light-emitting areas can be provided in a single crystal with different electrical contacts for lighting up these sections in a desired pattern.

While silicon carbide has been described as the preferred electroluminescent material, other materials such as gallium arsenide phosphide and gallium phosphide can be equally employed.

Since certain changes can be made in the above apparatus without departing from the scope of the invention herein involved, it is intended that all matter contained in the above description shall be interpreted as illustrative and not in a limting sense.

What is claimed is:

1. An electroluminescent junction diode having a light-emitting face, a portion of said face being transparent to emitted light, said portion being in the form of a predetermined design to emit light in said predetermined design, other portions of said face alongside of said predetermined design portion being substantially opaque to emitted light and comprising a heavily doped mask formed within a thin surface layer at said face by diffusion of an opacifying impurity into the transparent face portion of the diode, said mask being permanently implanted in said surface, and the light-emitting face having a smooth continuous surface spanning the predetermined design and the adjacent portions of the mask.

2. An electroluminescent silicon carbide junction diode having a light-emitting face, a transparent layer adjacent said face, an opaque mask permanently implanted into said face and defining a narrow light-emitting region in said transparent layer, said mask being formed in said transparent layer by diffusing an opacifying impurity into said transparent layer to form a thin opaque surface layer which constitutes said mask, said light-emitting face having a smooth continuous surface spanning the light-emitting region and the adjacent masked region.

References Cited

UNITED STATES PATENTS

| | | | |
|---|---|---|---|
| 1,835,226 | 12/1931 | Kuchenmeister | 179—100.3 |
| 2,735,049 | 2/1956 | De Forest | 317—235 |
| 3,183,359 | 5/1965 | White | 250—199 |
| 3,248,670 | 4/1966 | Dill et al. | 331—94.5 |
| 3,293,513 | 12/1966 | Biard et al. | 317—237 |
| 3,330,991 | 7/1967 | Lavine | 315—94 |
| 3,341,857 | 9/1967 | Kabell | 346—107 |
| 2,929,923 | 3/1960 | Lehovec | 250—7 |
| 2,776,367 | 1/1957 | Lehovec | 179—100.3 XR |

FOREIGN PATENTS 263,181  9/1927  Great Britain.

TERRELL W. FEARS, Primary Examiner

R. F. CARDILLO, Jr., Assistant Examiner

U.S. Cl. X.R.

317—235; 313—108; 346—107